(12) United States Patent
Muylaert et al.

(10) Patent No.: US 6,769,644 B2
(45) Date of Patent: Aug. 3, 2004

(54) TAIL BOOM SADDLE FOR MAINTAINING HELICOPTOR MAIN ROTOR BLADES IN A STOWED CONFIGURATION FOR HELICOPTER STOWAGE AND TRANSPORT

(75) Inventors: Neal W. Muylaert, Apache Junction, AZ (US); Kenneth R. MacGregor, Jr., Mesa, AZ (US); Kevin L. Venisnik, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/405,780

(22) Filed: Apr. 1, 2003

(65) Prior Publication Data

US 2004/0118971 A1 Jun. 24, 2004

Related U.S. Application Data

(63) Continuation-in-part of application No. 10/328,567, filed on Dec. 23, 2002.

(51) Int. Cl.[7] ............................................. B64C 27/50
(52) U.S. Cl. ....................... 244/17.11; 244/49; 416/143
(58) Field of Search ............................ 244/6, 7, 17.11, 244/49; 416/142, 143, 1, 61, 62, 146 R (56) References Cited

U.S. PATENT DOCUMENTS

| | | | | |
|---|---|---|---|---|
| 2,549,886 A | * | 4/1951 | Buivid ..................... 244/17.11 |
| 3,327,967 A | * | 6/1967 | Schrantz ................. 244/158 R |
| 4,268,222 A | * | 5/1981 | Bernard ......................... 416/1 |
| 4,301,982 A | * | 11/1981 | Tiemann .................. 244/17.11 |
| 4,712,978 A | * | 12/1987 | Tiemann ........................ 416/1 |
| 5,211,538 A | * | 5/1993 | Seghal et al. .................. 416/1 |
| 6,695,253 B1 | * | 2/2004 | Romani et al. ................ 244/6 |

* cited by examiner

Primary Examiner—Galen L. Barefoot
(74) Attorney, Agent, or Firm—Thompson Coburn LLP (57) ABSTRACT

A tail boom saddle for use with a helicopter. The helicopter has a fuselage, a main rotor assembly extending out from a forward section of the fuselage, and a plurality of main rotor blades operatively coupled to the main rotor assembly. A tail boom section of the fuselage includes a first frame member, a second frame member longitudinally spaced from the first frame member, a plurality of longerons extending between and intersecting with the first and second frame members, and a tail boom outer skin surrounding the frame members and longerons. The main rotor blades, are movable to a stowed position in which the main rotor blades extend generally rearwardly of the main rotor assembly. The tail boom saddle comprises upper and lower saddle portions adapted to exert clamping forces against the tail boom outer skin. The tail boom saddle is adapted and configured to at least assist in maintaining the main rotor blades in the stowed position. The upper saddle portion includes first and second support beams. The tail boom saddle is configured and adapted such that the first and second support beams engage an outer surface of the tail boom outer skin and extend generally along first and second upper longerons from the first frame member to the second frame member when the tail boom saddle is in a blade maintaining position.

29 Claims, 8 Drawing Sheets

TAIL BOOM SADDLE FOR MAINTAINING HELICOPTOR MAIN ROTOR BLADES IN A STOWED CONFIGURATION FOR HELICOPTER STOWAGE AND TRANSPORT

CROSS-REFERENCE TO RELATED APPLICATION

This application is a continuation-in-part of U.S. application Ser. No. 10/328,567, filed on Dec. 23, 2002. The application is hereby incorporated by reference herein.

STATEMENT REGARDING FEDERALLY SPONSORED RESEARCH

The present invention was made with government support under contract number DAAH23-00-C-001 awarded by the U.S. Army. Accordingly, the United States Government has certain rights in the present invention.

BACKGROUND OF THE INVENTION

To provide the power required to support the flight capabilities of helicopters, the main rotors of helicopters incorporate a plurality of main rotor blades having large radial dimensions. The large radial dimensions of helicopter rotor assemblies results in helicopters having large structural envelopes that occupy an inordinate amount of space. For example, an Apache helicopter, has a main rotor with four main rotor blades, a rotor diameter of approximately 48 feet (each main rotor blade has a length of approximately 21 feet), a fuselage length of approximately 49 feet, an overall length of approximately 58 feet and a height of nearly 17 feet. It is often desirable to reduce the structural envelopes of such helicopters to facilitate rapid deployment, routine transport, stowage, and/or to reduce the vulnerability thereof to environmental conditions. One way to reduce the structural envelopes of helicopters is to fold the main rotor blades relative to the rotor hub assembly (i.e., the main rotor assembly) such that the main rotor blades extend generally rearwardly relative to the rotor hub assembly.

It has been determined that it is desirable to support the main rotor blades relative to the helicopter during transportation of the helicopter. This has been accomplished with a tail boom saddle detachably secured to the tail boom of the helicopter. The main rotor blades are operatively connected to the tail boom saddle in a manner such that the main tail boom saddle maintains the main rotor blades in their folded configuration.

SUMMARY OF THE INVENTION

Generally, an assembly of the present invention comprises a helicopter and a tail boom saddle. The helicopter has a fuselage including a forward section and a tail boom section extending rearward of the forward section, a main rotor assembly extending out from the forward section of the fuselage, and a plurality of main rotor blades operatively coupled to the main rotor assembly. The tail boom section includes a first frame member, a second frame member longitudinally spaced from the first frame member, a plurality of longerons extending between and intersecting with the first and second frame members, and a tail boom outer skin surrounding the frame members and longerons. The longerons include first and second upper longerons. The main rotor blades are in a stowed position in which the main rotor blades extend generally rearwardly of the main rotor assembly. The tail boom saddle is detachably secured to the tail boom section of the helicopter. The main rotor blades are operatively secured to the tail boom saddle in a manner such that the tail boom saddle maintains the main rotor blades in the stowed position. The tail boom saddle has an upper saddle portion and a lower saddle portion. The upper and lower saddle portions exert clamping forces against the tail boom outer skin. The upper portion includes first and second support beams. The second support beam is laterally spaced from the first support beam. The first support beam is in engagement with an outer surface of the tail boom outer skin and extends generally along the first upper longeron from the first frame member to the second frame member. The second support beam is in engagement with the outer surface of the tail boom outer skin and extends generally along the second upper longeron from the first frame member to the second frame member.

Another aspect of the present invention is an assembly comprising a helicopter and a tail boom saddle. The helicopter has a fuselage including a forward section and a tail boom section extending rearward of the forward section, a main rotor assembly extending out from the forward section of the fuselage, and a plurality of main rotor blades operatively coupled to the main rotor assembly. The tail boom section includes a first frame member, a second frame member longitudinally spaced from the first frame member, a plurality of longerons extending between and intersecting with the first and second frame members, and a tail boom outer skin surrounding the frame members and longerons. The longerons include a first lower longeron. The main rotor blades are in a stowed position in which the main rotor blades extend generally rearwardly of the main rotor assembly. The tail boom saddle is detachably secured to the tail boom section of the helicopter. The main rotor blades are operatively secured to the tail boom saddle in a manner such that the tail boom saddle maintains the main rotor blades in the stowed position. The tail boom saddle has an upper saddle portion and a lower saddle portion. The upper and lower saddle portions exert clamping forces against the tail boom outer skin. The lower saddle portion comprises a lower saddle frame and at least one load distribution rocker mechanism operatively connected to the lower saddle frame. The rocker mechanism has a first tail-engaging pad and a second tail-engaging pad. The first tail-engaging pad is in engagement with the outer surface of the tail boom outer skin generally at the intersection of the first lower longeron and the first frame member. The second tail-engaging pad is in engagement with the outer surface of the tail boom outer skin generally at the intersection of the first lower longeron and the second frame member.

Another aspect of the present invention is a tail boom saddle for use with a helicopter. The helicopter has a fuselage including a forward section and a tail boom section extending rearward of the forward section, a main rotor assembly extending out from the forward section of the fuselage, and a plurality of main rotor blades operatively coupled to the main rotor assembly. The tail boom section includes a first frame member, a second frame member longitudinally spaced from the first frame member, a plurality of longerons extending between and intersecting with the first and second frame members, and a tail boom outer skin surrounding the frame members and longerons. The longerons include first and second upper longerons. The main rotor blades are movable to a stowed position in which the main rotor blades extend generally rearwardly of the main rotor assembly. The tail boom saddle comprises upper and lower saddle portions adapted to exert clamping forces against the tail boom outer skin. The tail boom saddle is adapted and configured to at least assist in maintaining the main rotor blades in the stowed position. The upper portion includes first and second support beams. The second support beam is laterally spaced from the first support beam. The tail boom saddle is configured and adapted such that the first support beam engages an outer surface of the tail boom outer skin and extends generally along the first upper longeron from the first frame member to the second frame member when the tail boom saddle is in a blade maintaining position and such that the second support beam engages the outer surface of the tail boom outer skin and extends generally along the second upper longeron from the first frame member to the second frame member when the tail boom saddle is in the blade maintaining position. The blade maintaining position is a position in which the upper and lower saddle portions exert clamping forces against the tail boom outer skin and the main rotor blades are operatively secured to the tail boom saddle in a manner such that the tail boom saddle maintains the main rotor blades in the stowed position.

Another aspect of the present invention comprises a tail boom saddle for use with a helicopter. The helicopter has a fuselage including a forward section and a tail boom section extending rearward of the forward section, a main rotor assembly extending out from the forward section of the fuselage, and a plurality of main rotor blades operatively coupled to the main rotor assembly. The tail boom section includes a first frame member, a second frame member longitudinally spaced from the first frame member, a plurality of longerons extending between and intersecting with the first and second frame members, and a tail boom outer skin surrounding the frame members and longerons. The longerons include a first lower longeron. The main rotor blades are movable to a stowed position in which the main rotor blades extend generally rearwardly of the main rotor assembly. The tail boom saddle comprises upper and lower saddle portions adapted to exert clamping forces against the tail boom outer skin. The tail boom saddle is adapted and configured to at least assist in maintaining the main rotor blades in the stowed position. The lower saddle portion comprises a lower saddle frame and at least one load distribution rocker mechanism operatively connected to the lower saddle frame. The rocker mechanism has a first tail-engaging pad and a second tail-engaging pad. The tail boom saddle is configured and adapted such that the first tail-engaging pad engages the outer surface of the tail boom outer skin generally at the intersection of the first lower longeron and the first frame member when the tail boom saddle is in a blade maintaining position and such that the second tail-engaging pad engages the outer surface of the tail boom outer skin generally at the intersection of the first lower longeron and the second frame member when the tail boom saddle is in the blade maintaining position. The blade maintaining position is a position in which the upper and lower saddle portions exert clamping forces against the tail boom outer skin and the main rotor blades are operatively secured to the tail boom saddle in a manner such that the tail boom saddle maintains the main rotor blades in the stowed position.

Other features and advantages will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Referring now to the drawings, and more particularly to FIGS. 1–4, an assembly of the present invention is indicated in its entirety by the reference numeral 20. The assembly 20 comprises a helicopter, generally indicated at 22, a tail boom saddle, generally indicated at 24, and a plurality of blade support mechanisms, generally indicated at 26.

Figure 1:
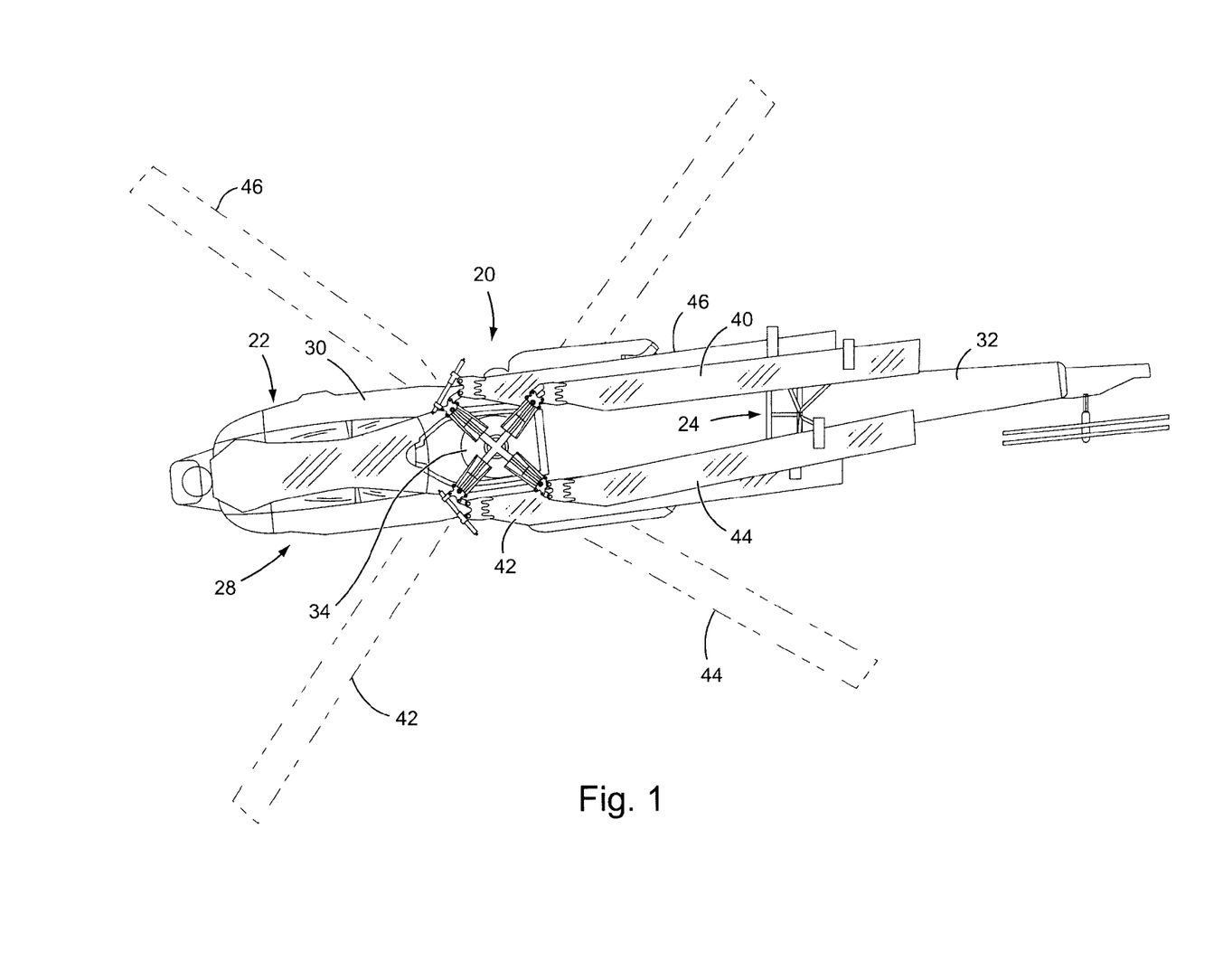
FIG. 1 is a top plan view of an assembly of the present invention, the assembly comprising a helicopter, a tail boom saddle detachably secured to a tail boom section of the helicopter, and a plurality of blade support mechanisms operatively securing main rotor blades of the helicopter to the tail boom saddle.
Figure 2:
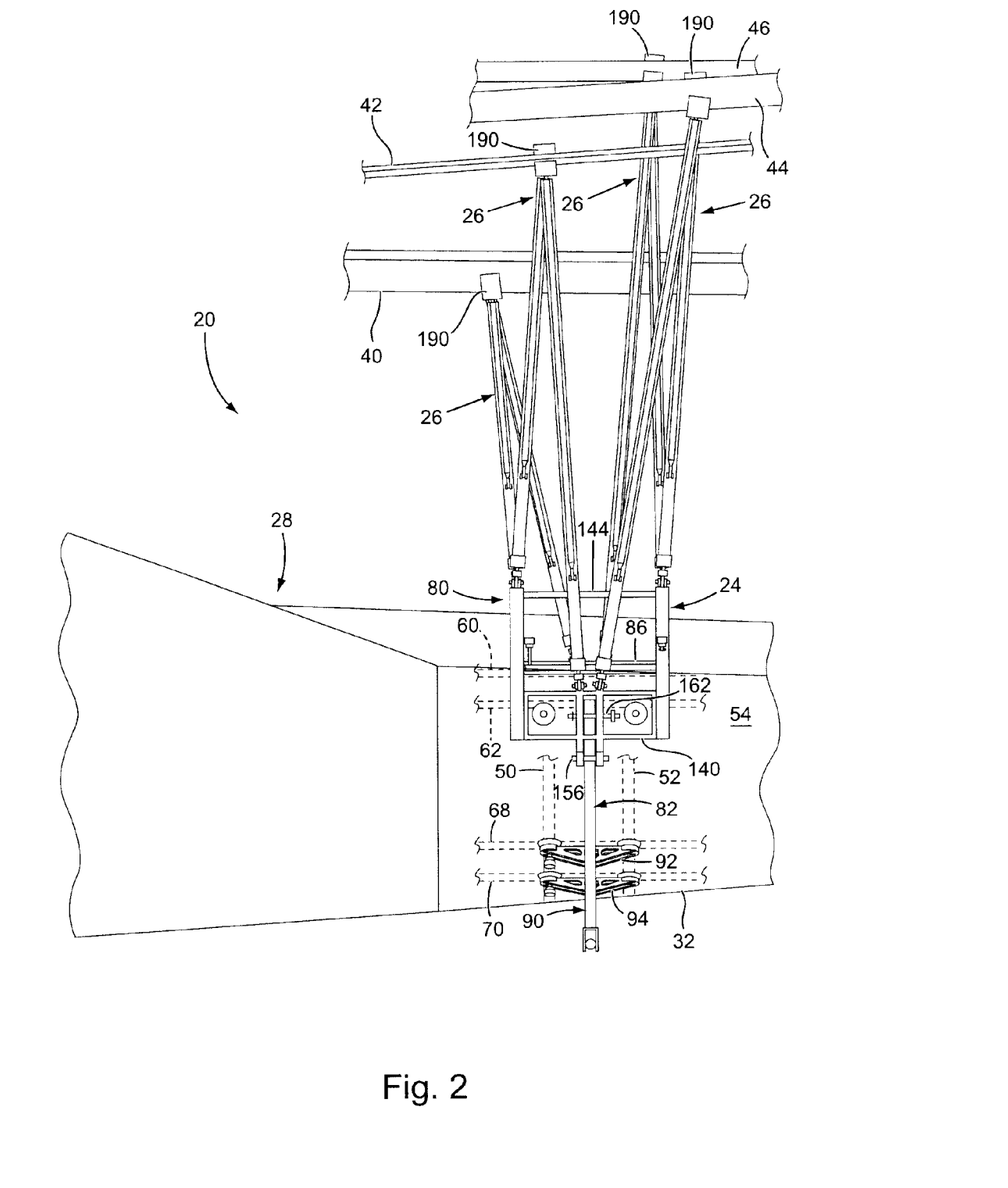
FIG. 2 is an enlarged fragmented left side elevational view of the assembly of FIG. 1.

The helicopter 22 is preferably an Apache military helicopter, currently manufactured by The Boeing Corporation (formerly manufactured by Boeing's predecessor McDonnell Douglas Corporation). The helicopter 22 has a fuselage, generally indicated at 28, including a forward section 30 and a tail boom section 32 extending rearward of the forward section. The helicopter 22 further comprises a main rotor assembly (i.e., main rotor hub), generally indicated at 34, extending out from the forward section 30 of the fuselage 28, and four main rotor blades operatively coupled to the main rotor assembly. The four main rotor blades comprise a first rotor blade 40, a second rotor blade 42, a third rotor blade 44, and a fourth rotor blade 46. FIGS. 1 and 2 show the main rotor blades 60, 62, 64, 66 in solid lines in a stowed position for stowage and transportation of the helicopter. FIG. 1 also shows the main rotor blades in phantom lines representative of a deployed position. The deployed position is a position in which the main rotor blades are attached to the main rotor assembly 34 in an orientation such that the helicopter 22 is ready for flight operations. Preferably, the main rotor blades are folded to their stowed positions to the extent and in the manner disclosed in U.S. patent application Ser. No. 10/329,250 (incorporated herein by reference), entitled Apparatus And Method For Folding Helicopter Rotor Blades For Storage And Transport Of Helicopter, filed on Dec. 23, 2002, and assigned to the assignee of the present patent application. The tail boom saddle 24 and the blade support mechanisms 26 maintain the main rotor blades 40, 42, 44, 46 in their stowed positions. If the helicopter 22 with its main rotor blades in the stowed positions is subjected to relatively high winds (a likely scenario if the helicopter is outside awaiting loading onto a transport vehicle or awaiting a deployment set-up operation), the action of the wind on the blades might result in substantial forces at contact regions of the tail boom saddle 24 against the tail boom section 32 of the fuselage 28. The tail boom section 32 might also be subjected to substantial forces at such contact regions during certain flight maneuvers of a cargo airplane carrying the helicopter 22. The tail boom saddle 24 is preferably configured to reduce the likelihood that such forces will damage the tail boom section 32 of the fuselage 28.

Figure 3:
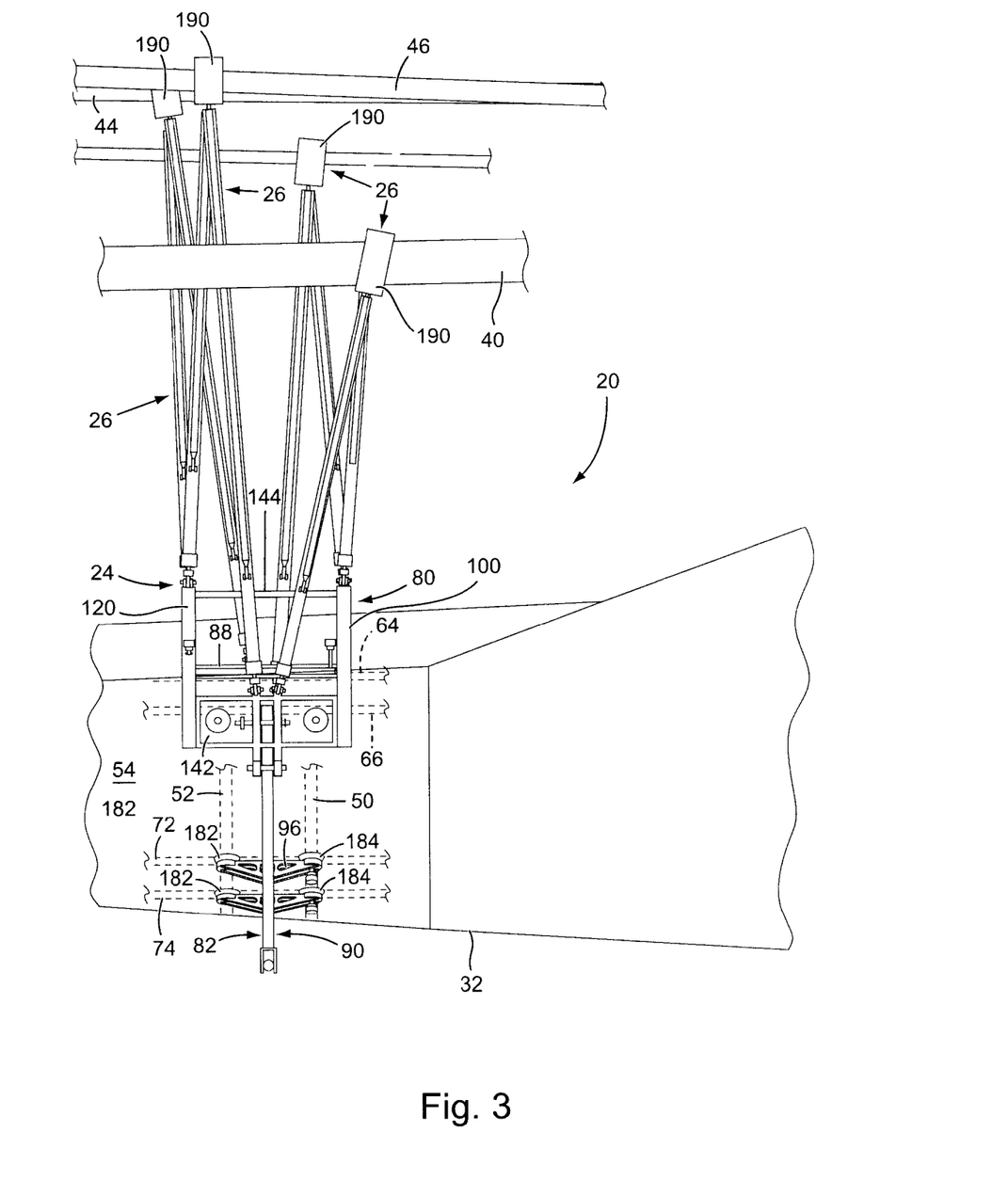
FIG. 3 is an enlarged fragmented right side elevational view of the assembly of FIG. 1.
Figure 5:
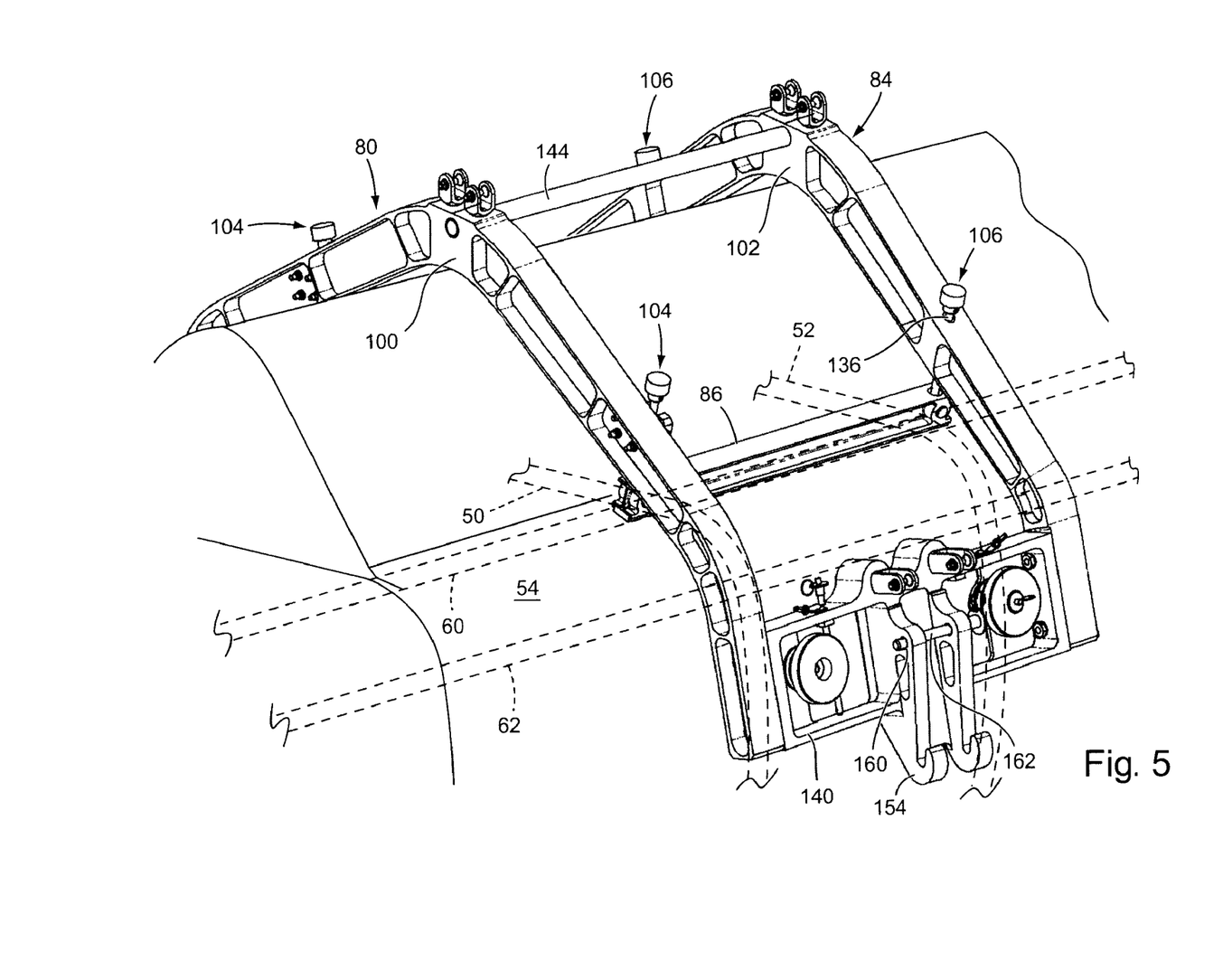
FIG. 5 is an enlarged fragmented perspective view showing an upper saddle portion of the tail boom saddle of FIG. 1.

The tail boom section 32 of the fuselage 28 of the helicopter 22 includes a plurality of frame members longitudinally spaced from one another, a plurality of longitudinally extending longerons intersecting peripheral edges of the frame members, and a tail boom outer skin 54 surrounding the frame members and longerons. As shown in FIGS. 2, 3 and 5, the tail boom frame members include a forward frame member 50 and an aft frame member 52 rearwardly spaced from the forward frame member. Although the tail boom section 32 of the fuselage 28 is described as having the forward and aft frame members 50, 52, it is to be understood that the tail boom section includes additional frame members. The longerons of the tail boom section 32 include first and second upper left-side longerons, 60, 62, first and second upper right-side longerons, 64, 66, first and second lower left-side longerons 68, 70, and first and second lower right-side longerons 72, 74.

The tail boom saddle 24 comprises an upper saddle portion, generally indicated at 80, and a lower saddle portion, generally indicated at 82. The upper saddle portion 82 includes an upper saddle frame, generally indicated at 84, a first (left) support beam 86, and a second (right) support beam 88. The lower saddle portion 82 includes a lower saddle frame, generally indicated at 90, first and second left rocker mechanisms 92, 94, and first and second right rocker mechanisms 96, 98. The upper and lower saddle portions 80, 82 exert clamping forces against the tail boom outer skin 54 sufficient to detachable secure the tail boom saddle 24 to the tail boom section 32 of the helicopter 22. The support beams 86, 88 and the rocker mechanisms 92, 94, 96, 98 space the upper and lower saddle frames 84, 90 from the tail boom outer skin 54. As discussed in greater detail below, the tail boom saddle 24 is adapted and configured such that when it is in a blade maintaining position (shown in FIGS. 1–4), the upper and lower saddle portion 80, 82 exert clamping forces primarily at the intersections of the longerons and the forward and aft frame members 50, 52 of the tail boom section 32. The blade maintaining position is a position in which the upper and lower saddle portions 80, 82 exert clamping forces against the tail boom outer skin 54 and the main rotor blades 40, 42, 44, 46 are operatively secured to the tail boom saddle 24 in a manner such that the tail boom saddle maintains the main rotor blades in the stowed position.

Referring to FIG. 5, the upper saddle frame 84 preferably comprises forward and aft upper saddle frame members 100, 102. The left and right support beams 86, 88 are each operatively connected to the forward and aft upper saddle frame members 100, 102 via forward and aft support beam connector assemblies 104, 106. Although both the left and right support beams 86, 88 are operatively connected to the forward and aft upper saddle frame members 100, 102 via the forward and aft support beam connector assemblies 104, 106, only the left support beam and the associated support beam connector assemblies are described in detail. However, it is to be understood that the description of the left support beam is equally applicable to the right support beam.

Figure 6:
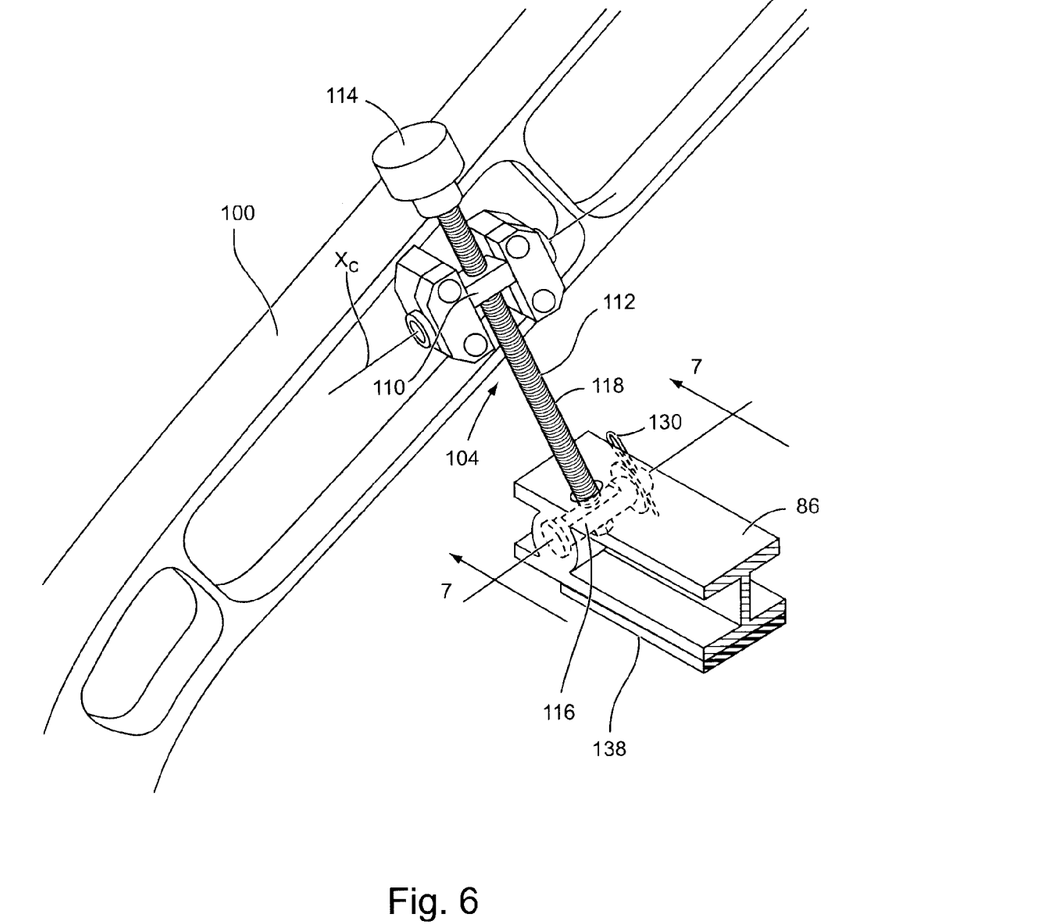
FIG. 6 is an enlarged fragmented perspective view of support beam and support beam connector assembly of the upper saddle portion of FIG. 5.
Figure 7:
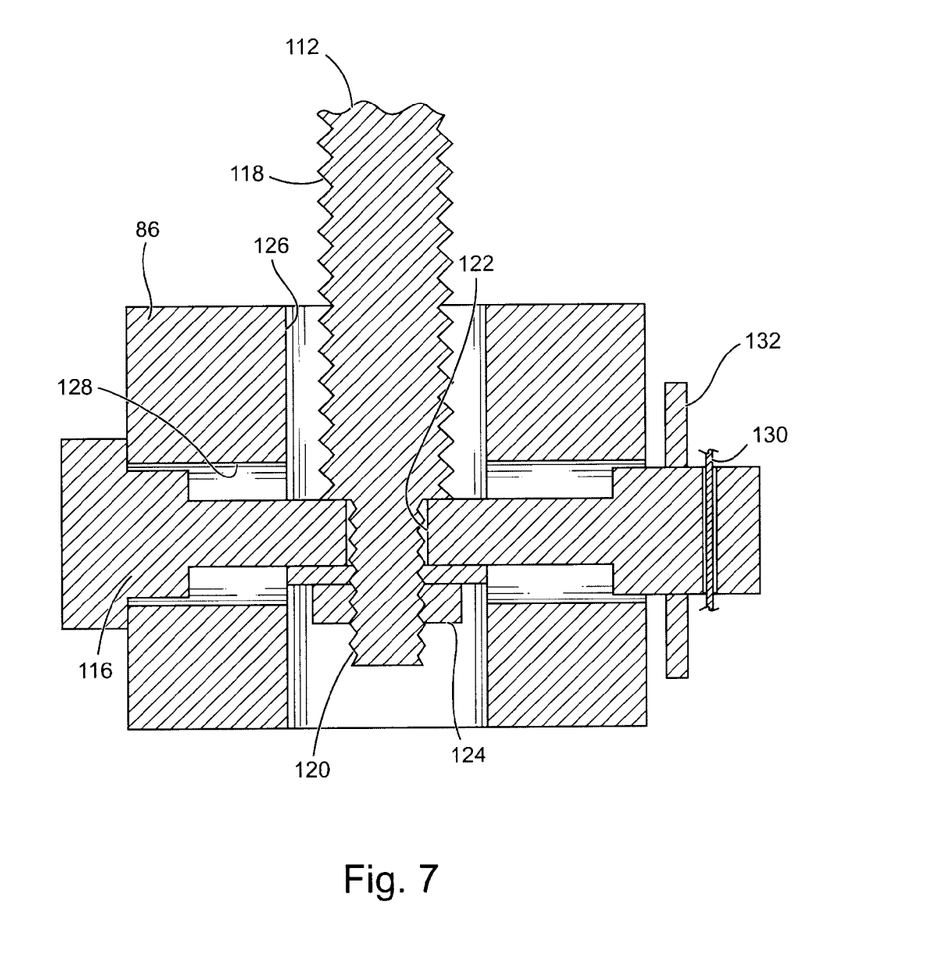
FIG. 7 is a fragmented section view taken along the plane of line 7—7 of FIG. 6 showing the connection of the support beam and support beam connector assembly of FIG. 6.

Referring to FIGS. 6 and 7, the forward support beam connector assembly 104 comprises a threaded nut 110, a threaded rod 112, a torque limiting knob 114, and a beam engaging pin 116. The threaded nut 110 includes laterally extending bearings journaled to the forward upper saddle frame member 100 for pivotal movement of the threaded nut relative to the forward upper saddle frame member about a connector axis $X_c$. The threaded rod 112 includes a threaded main portion 118 of a first diameter (e.g., ⅜") and a threaded lower end portion 120 of a second reduced diameter (e.g., ¼"). The threaded main portion 118 of the threaded rod 112 threadably engages the threaded nut 110. The torque limiting knob 114 is fixed to the upper end of the threaded rod. The beam-engaging pin 116 has a through lateral opening 122 sufficiently large to enable the threaded lower end portion 120 of the threaded rod 112 to pass therethrough, but sufficiently small to prevent the threaded main portion 118 of the threaded rod to extend into the opening. A small nut 124 is threaded onto the threaded lower end portion 120 of the threaded rod 112 to secure the beam-engaging pin 116 to the threaded rod. The left support beam 86 includes a forward rod-receiving bore 126 and a forward pin-receiving bore 128. The forward rod-receiving bore 128 is sufficiently large to permit passage of the threaded rod 112 and to permit a user to insert the small nut 124 into the rod-receiving bore from the underside of the left support beam 86 and thread it onto the threaded lower end portion 120 of the threaded rod. Preferably, the rod-receiving bore has a diameter of about ¾". The forward pin-receiving bore 128 is generally perpendicular to the forward rod-receiving bore 126 and is sized for receiving the beam-engaging pin 116. The beam-engaging pin 116 includes a head at one end larger than diameter of the forward rod-receiving bore 126. The opposite end of the beam-engaging pin 116 is adapted to extend out the forward rod-receiving bore 126 and receive a cotter pin 130. The beam-engaging pin 116 is maintained in the forward rod-receiving bore 126 by the cotter pin 130 and a washer 132. The beam-engaging pin 116 is adapted to pivot within the forward rod-receiving bore 126.

Referring again to FIG. 5, the aft support beam connector assembly 106 is similar to the forward support beam connector assembly 104 except the threaded rod of the aft support beam connector assembly extends through a saddle frame bore 136 in the aft upper saddle frame member 102 and is threadably coupled to such saddle frame member via a threaded insert (not shown) secured in the saddle frame bore. The right support beam 88 is similar to the left support beam 86 and is operatively connected to the forward and aft upper saddle frame members 100, 102 via another pair of forward and aft support beam connector assemblies 104, 106. The tail boom saddle 24 is adapted and configured such that when it is in the blade maintaining position (shown in FIGS. 1–4): (a) the left support beam 86 engages the tail boom outer skin 54 and extends generally along the first upper left-side longeron 60 from the forward frame member 50 of the tail boom section 32 to the aft frame member 52 of the tail boom section; and (b) the right support beam 88 engages the tail boom outer skin and extends generally along the first upper right-side longeron 64 from the forward frame member 50 of the tail boom section 32 to the aft frame member 52 of the tail boom section. Preferably, the underside of each support beam 86, 88 comprises a soft pad 138 to protect the surface of the tail boom outer skin 54. The distances between the support beams 86, 88 and the frame members 50, 52 may be adjusted by turning the threaded rods of the forward and aft support beam connector assemblies 104, 106 relative to the frame members. The torque limiting knobs 114 are secured to the upper ends of the threaded rods of the forward and aft support beam connector assemblies 104, 106. A user turns the threaded rods relative to the frame members 50, 52 by turning the torque limiting knobs 114. The torque limiting knobs 114 are configured and adapted to prevent the threaded rods to be over-tightened (i.e., are adapted to limit the clamping forces exerted against the tail boom outer skin 54 by the support beams 86, 88). In particular, the torque limiting knobs 114 include ratchet mechanisms configured such that the knobs rotate relative to the threaded rods when the torque exceeds a predetermined limit.

Figure 4:
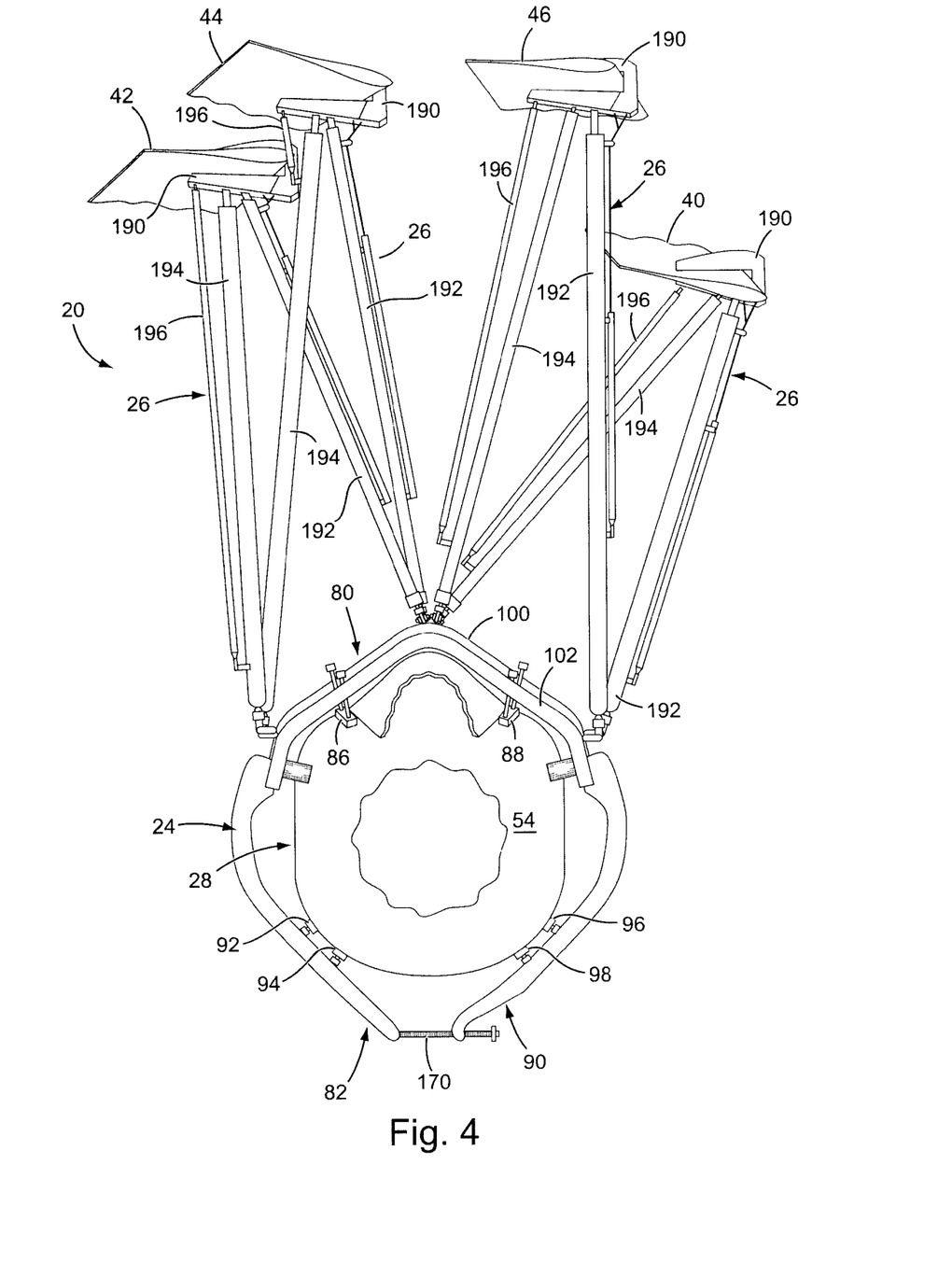
FIG. 4 is an enlarged fragmented aft elevational view of the assembly of FIG. 1.
Figure 8:
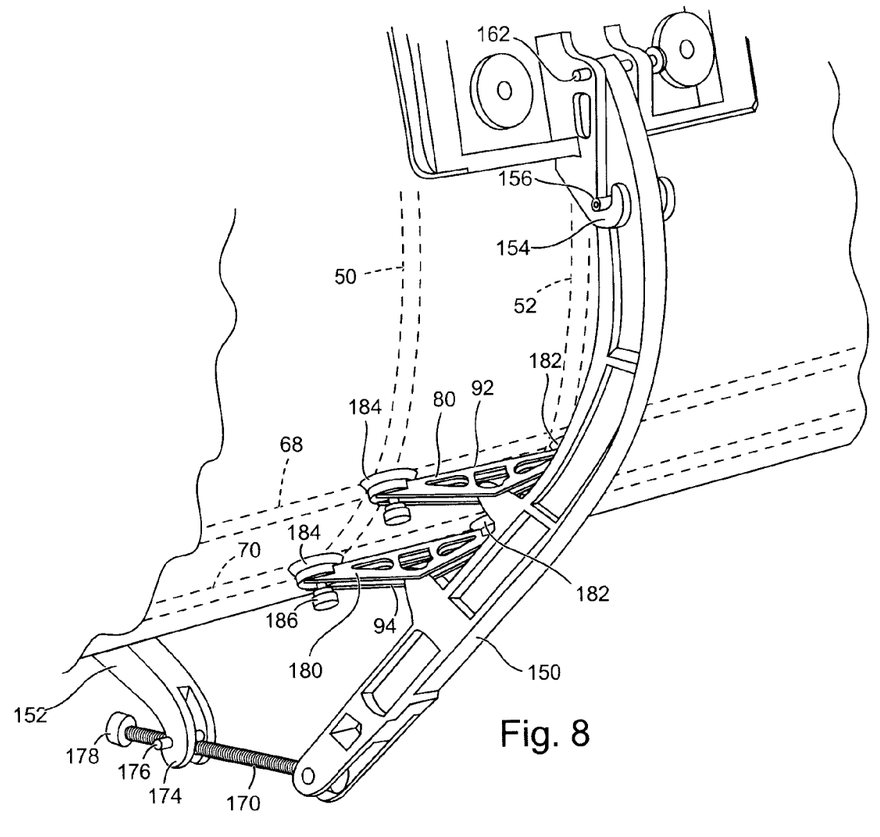
FIG. 8 is a fragmented perspective view of a lower saddle portion of the tail boom saddle of FIG. 1.

Referring to FIG. 5, the upper saddle frame 84 preferably also includes left and right side braces 140, 142 and a central brace 144 secured to and extending between the forward and aft upper saddle frame members 100, 102. As shown in FIGS. 4 and 8, the lower saddle frame 90 comprises a left lower saddle frame member 150 and a right lower saddle frame member 152. The left lower saddle frame member 150 is detachably connected to the left side brace 140 of the upper saddle frame 84 and the right lower saddle frame member 152 is detachably connected to the right side brace 142. The left side brace 140 includes a left pin-receiving slot 154 at its lower end which receives a connecting pin 156 fixed to and extending from the left lower saddle frame member 150. The upper end of the left lower saddle frame member includes a pin-receiving aperture aligned with pin-receiving apertures through the left side brace 140. A pin 162 detachably extends through the aligned pin-receiving apertures. Thus, the left lower saddle frame member 150 is detachably connected to the left side brace 140 of the upper saddle frame 84 via the pins 156, 162. Although not described in detail, it is to be understood that the right lower saddle frame member 152 is preferably detachably connected to the right side brace 142 in the same manner as the connection of the left lower saddle frame member 150 to the left side brace 140.

Bottom ends of the lower saddle frame members 150, 152 are operatively connected together via a connecting rod 170 (FIG. 8). The connecting rod 170 is journaled at one end to a pivot pin 172 connected to the bottom end of the left lower saddle frame member 150. The connecting rod 170 is journaled to the pivot pin 172 in a manner to permit rotation of the connecting rod 170 relative to the pivot pin about a longitudinal axis of the connecting rod. The pivot pin 172 is pivotally connected to the bottom end of the left lower saddle frame member 150 in a manner to permit the connecting rod 170 to swing about a longitudinal axis of the pivot pin. Preferably, the longitudinal axis of the pivot pin 172 is perpendicular to the longitudinal axis of the connecting rod 170. The bottom end of the right lower saddle frame member 152 preferably includes a j-shaped slot 174 adapted to receive a nut 176 threadably engaging a threaded or surface of the connecting rod 170. A knob 178 is preferably fixed to the end of the connecting rod 170 opposite the pivot pin 172 to facilitate rotation of the connecting rod 170 about its longitudinal axis. Rotating the connecting rod 170 about its longitudinal axis causes the nut 176, within the j-shaped slot 174, to move along the longitudinal axis of the connecting rod. Thus, rotation of the connecting rod 170 in a first direction causes the bottom ends of the lower saddle frame members 150, 152 to move toward one another, and rotation of the connecting rod in a second opposite direction causes the bottom ends of the lower saddle frame members to move away from one another.

The first and second left rocker mechanisms 92, 94 space the left lower saddle frame member 150 from the tail boom outer skin 54. The first and second right rocker mechanisms 96, 98 space the right lower saddle frame member 152 from the tail boom outer skin. As shown in FIGS. 2, 3, and 8, each rocker mechanism preferably comprises a main rocker body 180, a fixed fuselage-engaging pad 182, and an adjustable fuselage-engaging pad 184. An intermediate portion of the rocker body 180 of each rocker mechanism is pinned to its corresponding lower saddle frame member 150, 152 for pivotal movement of the rocker body relative to its corresponding lower saddle frame member. The fixed fuselage-engaging pad 182 is fixed to a first end of the main rocker body 180 and is adapted to abut the tail boom outer skin 54. The adjustable fuselage-engaging pad 184 is adjustably connected to a second end of the main rocker body 180 via a threaded shank which threadably engages and extends through the second end of the main rocker body. A torque limiting knob 186 is secured to threaded shank and is adapted to turn the threaded shank to vary the distance between the adjustable fuselage-engaging pad 182 and the second end of the main rocker body 180. The torque limiting knob 186 is configured and adapted to prevent the threaded shank to be over-tightened (i.e., is adapted to limit the clamping forces exerted against the tail boom our skin 54 by the fixed and adjustable fuselage-engaging pads 182, 184). In particular, the torque limiting knob 186 includes a ratchet mechanism configured such that the knob rotates relative to the threaded shank when the torque exceeds a predetermined limit. The rocker mechanisms are sized and adapted to enable the fuselage-engaging pads 182, 184 to engage the tail boom outer skin 54 at the intersections of longerons and the forward and aft frame members 50, 52 of the tail boom section 32.

Referring to FIGS. 2–4, the tail boom saddle 24 is shown in a blade maintaining position. In the blade maintaining position, the left support beam 86 preferably extends along the first upper left-side longeron 60 from the aft frame member 52 to the forward frame member 50 and engages the tail boom outer skin 54 at that location. In the blade maintaining position, the right support beam 88 preferably extends along the first upper right-side longeron 64 from the aft frame member 52 to the forward frame member 50 and engages the tail boom outer skin 54 at that location. In other words, when the tail boom saddle 24 is in its blade maintaining position, the left support beam 86 exerts forces against the tail boom outer skin 54 where the tail boom outer skin is supported by the first upper left-side longeron 60 and the right support beam 88 exerts forces against the tail boom outer skin 54 where the tail boom outer skin is supported by the first upper right-side longeron 64. Also, when the tail boom saddle 24 is in its blade maintaining position: (a) the adjustable fuselage-engaging pad 184 of the first left rocker mechanism 92 preferably abuts the tail boom outer skin 54 at the intersection of the first lower left-side longeron 68 and the forward frame member 50, and the fixed fuselage-engaging pad of the first left rocker mechanism preferably abuts the tail boom outer skin at the intersection of the first lower left-side longeron and the aft frame member 52; (b) the adjustable fuselage-engaging pad 184 of the second left rocker mechanism 94 preferably abuts the tail boom outer skin 54 at the intersection of the second lower left-side longeron 70 and the forward frame member 50, and the fixed fuselage-engaging pad 182 of the second left rocker mechanism preferably abuts the tail boom outer skin at the intersection of the second lower left-side longeron 70 and the aft frame member 52; (c) the adjustable fuselage-engaging pad 184 of the first right rocker mechanism 96 preferably abuts the tail boom outer skin 54 at the intersection of the first lower right-side longeron 72 and the forward frame member 50, and the fixed fuselage-engaging pad of the first right rocker mechanism preferably abuts the tail boom outer skin at the intersection of the first lower left-side longeron 72 and the aft frame member 52; and (d) the adjustable fuselage-engaging pad 184 of the second right rocker mechanism 98 preferably abuts the tail boom outer skin 54 at the intersection of the second lower right-side longeron 74 and the forward frame member 50, and the fixed fuselage-engaging pad of the second right rocker mechanism 98 preferably abuts the tail boom outer skin at the intersection of the second lower left-side longeron 74 and the aft frame member 52. To properly clamp the tail boom saddle 24 to the tail boom section 32 of the fuselage 28, the torque limiting knobs 114, 186 are turned to tighten the support beams 86, 88 and rocker mechanisms 92, 94, 96, 98 against the tail boom outer skin 54. Preferably, the torque limiting knobs 114, 186 are configured to enable the tail boom saddle 24 to be securely clamped to the tail boom section 32 and avoid over-clamping of the tail boom saddle to the tail boom section.

Referring to FIGS. 2–4, the blade support mechanisms 26 operatively secure the main rotor blades 40, 42, 44, 46 to the tail boom saddle 24. Each blade support mechanism 26 comprises a blade-clamping mechanism 190 adapted to detachably engage one of the rotor blades, a main pole 192, a secondary pole 194, and a support strut 196. The main pole 192 is secured at its upper end to the blade-clamping mechanism 190 and its lower end is adapted for detachable connection to the upper saddle portion 80 of the tail boom saddle 24. The secondary pole 194 is secured at its upper end to the blade-clamping mechanism 190 and its lower end is adapted for detachable connection to the upper saddle portion 80 of the tail boom saddle 24. The support strut 196 is adapted to adjust the angular position of the blade-clamping mechanism 190 relative to the main pole 192 and to maintain an angular position of the rotor blade relative to the tail boom saddle 24. When the tail boom saddle 24 is in its blade maintaining position with the blade-clamping mechanisms 190 secured to the rotor blades 40, 42, 44, 46, and the poles 192, 194 secured to the upper saddle portion 80 of the tail boom saddle 24, the main and secondary poles 192, 194 of each blade support mechanism 26 act as an A-frame to maintain each rotor blade in its stowed position. Preferably, the main poles 192 and the secondary poles 194 are detachably connectable to the upper saddle portion 80 via J-lock fittings, commercially available from Avibank, Inc. of California.

In operation, the tail boom saddle 24 is clamped in its blade maintaining position to the tail boom section 32 and the rotor blades 40, 42, 44, 46 are folded to their stowed positions. Because the support beams 86, 88 and the rocker mechanisms 92, 94, 96, 98 engage the tail boom outer skin 54 only where the outer skin is supported by the longerons and frame members 50, 52, the likelihood of damage to the tail boom section 32 is minimized. Preferably, each blade is folded to its stowed position with the assistance of a blade handling pole (not shown) and one of the blade support mechanisms 26. Preferably, the blade handling pole includes a blade clamping mechanism and a pole extending from the blade clamping mechanism. Preferably the pole of the blade handling pole extends from the blade clamping mechanism at an angle such that the pole does not bump into the tail boom of the helicopter as the blades are folded to their stowed positions. With the rotor blades in their stowed positions, the poles 192, 194 are detachably secured to the upper saddle portion 80 to operatively secure the main rotor blades to the tail boom saddle 24, and thereby maintain the rotor blades in their stowed positions during transportation and stowage of the helicopter.

In view of the above, it will be seen that several advantageous results are attained by the present invention.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. An assembly comprising:

a helicopter having a fuselage including a forward section and a tail boom section extending rearward of the forward section, a main rotor assembly extending out from the forward section of the fuselage, and a plurality of main rotor blades operatively coupled to the main rotor assembly, the tail boom section including a first frame member, a second frame member longitudinally spaced from the first frame member, a plurality of longerons extending between and intersecting with the first and second frame members, and a tail boom outer skin surrounding the frame members and longerons, the longerons including first and second upper longerons, the main rotor blades being in a stowed position in which the main rotor blades extend generally rearwardly of the main rotor assembly; and a tail boom saddle detachably secured to the tail boom section of the helicopter, the main rotor blades being operatively secured to the tail boom saddle in a manner such that the tail boom saddle maintains the main rotor blades in the stowed position, the tail boom saddle having an upper saddle portion and a lower saddle portion, the upper and lower saddle portions exerting clamping forces against the tail boom outer skin, the upper portion including first and second support beams, the second support beam being laterally spaced from the first support beam, the first support beam being in engagement with an outer surface of the tail boom outer skin and extending generally along the first upper longeron from the first frame member to the second frame member, the second support beam being in engagement with the outer surface of the tail boom outer skin and extending generally along the second upper longeron from the first frame member to the second frame member.

2. assembly as set forth in claim 1 wherein the upper portion of the tail boom saddle further comprises an upper saddle frame and support beam connectors operatively connecting the support beams to the upper saddle frame, the support beams and the support beam connectors spacing the upper saddle frame a distance from the tail boom outer skin.

3. An assembly as set forth in claim 2 wherein the support beam connectors are adapted to adjust the distance between the upper saddle frame and the tail boom outer skin.

4. An assembly as set forth in claim 2 wherein the support beam connectors comprise torque limiting screws.

5. An assembly as set forth in claim 1 wherein the plurality of longerons further includes a first lower longeron, and wherein the lower saddle portion comprises a lower saddle frame and at least one load distribution rocker mechanism operatively connected to the lower saddle frame, the rocker mechanism having a first tail-engaging pad and a second tail-engaging pad, the first tail-engaging pad being in engagement with the outer surface of the tail boom outer skin generally at the intersection of the first lower longeron and the first frame member, the second tail-engaging pad being in engagement with the outer surface of the tail boom outer skin generally at the intersection of the first lower longeron and the second frame member.

6. An assembly as set forth in claim 5 wherein the rocker mechanism spaces the lower saddle frame a distance from the tail boom outer skin.

7. An assembly as set forth in claim 6 wherein the rocker mechanism further comprises a rocker member, the first and second tail-engaging pads being operatively connected to the rocker member.

8. An assembly as set forth in claim 7 further comprising a pad connector operatively connecting the first tail-engaging pad to the rocker member, the pad connector being adapted to adjust the distance between the lower saddle frame and the tail boom outer skin.

9. An assembly as set forth in claim 8 further comprising a pad connector operatively connecting the first tail-engaging pad to the rocker member, the pad connector comprising a torque limiting screw.

10. An assembly as set forth in claim 5 further comprising a plurality of blade support mechanisms operatively securing the main rotor blades to the tail boom saddle, each blade support mechanism comprising a blade clamping mechanism detachably secured to one of the rotor blades, a saddle connection mechanism detachably secured to the tail boom saddle and a pole extending generally between the blade clamping mechanism and the saddle connection.

11. An assembly as set forth in claim 5 further comprising a plurality of blade support mechanisms operatively securing the main rotor blades to the tail boom saddle, each blade support mechanism comprising a blade clamping mechanism detachably secured to one of the rotor blades, a main saddle connection mechanism detachably secured to the tail boom saddle, a main pole extending generally between the blade clamping mechanism and the main saddle connection, a secondary saddle connection mecanism detachably secured to the tail boom saddle, and a secondary pole extending generally between the blade clamping mechanism and the secondary saddle connection, the secondary saddle connection being spaced from the main saddle connection.

12. An assembly as set forth in claim 1 further comprising a plurality of blade support mechanisms operatively securing the main rotor blades to the tail boom saddle, each blade support mechanism comprising a blade clamping mechanism detachably secured to one of the rotor blades, a saddle connection mechanism detachably secured to the tail boom saddle and a pole extending generally between the blade clamping mechanism and the saddle connection.

13. An assembly as set forth in claim 1 further comprising a plurality of blade support mechanisms operatively securing the main rotor blades to the tail boom saddle, each blade support mechanism comprising a blade clamping mechanism detachably secured to one of the rotor blades, a main saddle connection mechanism detachably secured to the tail boom saddle, a main pole extending generally between the blade clamping mechanism and the main saddle connection, a secondary saddle connection mechanism detachably secured to the tail boom saddle, and a secondary pole extending generally between the blade clamping mechanism and the secondary saddle connection, the secondary saddle connection being spaced from the main saddle connection.

14. An assembly comprising:
  a helicopter having a fuselage including a forward section and a tail boom section extending rearward of the forward section, a main rotor assembly extending out from the forward section of the fuselage, and a plurality of main rotor blades operatively coupled to the main rotor assembly, the tail boom section including a first frame member, a second frame member longitudinally spaced from the first frame member, a plurality of longerons extending between and intersecting with the first and second frame members, and a tail boom outer skin surrounding the frame members and longerons, the longerons including a first lower longeron, the main rotor blades being in a stowed position in which the main rotor blades extend generally rearwardly of the main rotor assembly; and
  a tail boom saddle detachably secured to the tail boom section of the helicopter, the main rotor blades being operatively secured to the tail boom saddle in a manner such that the tail boom saddle maintains the main rotor blades in the stowed position, the tail boom saddle having an upper saddle portion and a lower saddle portion, the upper and lower saddle portions exerting clamping forces against the tail boom outer skin, the lower saddle portion comprising a lower saddle frame and at least one load distribution rocker mechanism operatively connected to the lower saddle frame, the rocker mechanism having a first tail-engaging pad and a second tail-engaging pad, the first tail-engaging pad being in engagement with the outer surface of the tail boom outer skin generally at the intersection of the first lower longeron and the first frame member, the second tail-engaging pad being in engagement with the outer surface of the tail boom outer skin generally at the intersection of the first lower longeron and the second frame member.

15. An assembly as set forth in claim 14 wherein the rocker mechanism spaces the lower saddle frame a distance from the tail boom outer skin.

16. An assembly as set forth in claim 15 wherein the rocker mechanism further comprises a rocker member, the first and second tail-engaging pads being operatively connected to the rocker member.

17. An assembly as set forth in claim 16 further comprising a pad connector operatively connecting the first tail-engaging pad to the rocker member, the pad connector being adapted to adjust the distance between the lower saddle frame and the tail boom outer skin.

18. An assembly as set forth in claim 17 further comprising a pad connector operatively connecting the first tail-engaging pad to the rocker member, the pad connector comprising a torque limiting screw.

19. An assembly as set forth in claim 14 further comprising a plurality of blade support mechanisms operatively securing the main rotor blades to the tail boom saddle, each blade support mechanism comprising a blade clamping mechanism detachably secured to one of the rotor blades, a saddle connection mechanism detachably secured to the tail boom saddle and a pole extending generally between the blade clamping mechanism and the saddle connection.

20. An assembly as set forth in claim 14 further comprising a plurality of blade support mechanisms operatively securing the main rotor blades to the tail boom saddle, each blade support mechanism comprising a blade clamping mechanism detachably secured to one of the rotor blades, a main saddle connection mechanism detachably secured to the tail boom saddle, a main pole extending generally between the blade clamping mechanism and the main saddle connection, a secondary saddle connection mechanism detachably secured to the tail boom saddle, and a secondary pole extending generally between the blade clamping mechanism and the secondary saddle connection, the secondary saddle connection being spaced from the main saddle connection.

21. A tail boom saddle for use with a helicopter, the helicopter having a fuselage including a forward section and a tail boom section extending rearward of the forward section, a main rotor assembly extending out from the forward section of the fuselage, and a plurality of main rotor blades operatively coupled to the main rotor assembly, the tail boom section including a first frame member, a second frame member longitudinally spaced from the first frame member, a plurality of longerons extending between and intersecting with the first and second frame members, and a tail boom outer skin surrounding the frame members and longerons, the longerons including first and second upper longerons, the main rotor blades being movable to a stowed position in which the main rotor blades extend generally rearwardly of the main rotor assembly, the tail boom saddle comprising upper and lower saddle portions adapted to exert clamping forces against the tail boom outer skin, the tail boom saddle being adapted and configured to at least assist in maintaining the main rotor blades in the stowed position, the upper portion including first and second support beams, the second support beam being laterally spaced from the first support beam, the tail boom saddle being configured and adapted such that the first support beam engages an outer surface of the tail boom outer skin and extends generally along the first upper longeron from the first frame member to the second frame member when the tail boom saddle is in a blade maintaining position and such that the second support beam engages the outer surface of the tail boom outer skin and extends generally along the second upper longeron from the first frame member to the second frame member when the tail boom saddle is in the blade maintaining position, the blade maintaining position being a position in which the upper and lower saddle portions exert clamping forces against the tail boom outer skin and the main rotor blades are operatively secured to the tail boom saddle in a manner such that the tail boom saddle maintains the main rotor blades in the stowed position.

22. A tail boom saddle as set forth in claim 21 wherein the upper portion of the tail boom saddle further comprises an upper saddle frame and support beam connectors operatively connecting the support beams to the upper saddle frame, the support beams and the support beam connectors being adapted to space the upper saddle frame a distance from the tail boom outer skin when the tail boom saddle is in the blade maintaining position.

23. A tail boom saddle as set forth in claim 22 wherein the support beam connectors are adapted to adjust the distance between the upper saddle frame and the tail boom outer skin.

24. A tail boom saddle as set forth in claim 22 wherein the support beam connectors comprise torque limiting screws.

25. A tail boom saddle for use with a helicopter, the helicopter having a fuselage including a forward section and a tail boom section extending rearward of the forward section, a main rotor assembly extending out from the forward section of the fuselage, and a plurality of main rotor blades operatively coupled to the main rotor assembly, the tail boom section including a first frame member, a second frame member longitudinally spaced from the first frame member, a plurality of longerons extending between and intersecting with the first and second frame members, and a tail boom outer skin surrounding the frame members and longerons, the longerons including a first lower longeron, the main rotor blades being movable to a stowed position in which the main rotor blades extend generally rearwardly of the main rotor assembly, the tail boom saddle comprising upper and lower saddle portions adapted to exert clamping forces against the tail boom outer skin, the tail boom saddle being adapted and configured to at least assist in maintaining the main rotor blades in the stowed position, the lower saddle portion comprising a lower saddle frame and at least one load distribution rocker mechanism operatively connected to the lower saddle frame, the rocker mechanism having a first tail-engaging pad and a second tail-engaging pad, the tail boom saddle being configured and adapted such that the first tail-engaging pad engages the outer surface of the tail boom outer skin generally at the intersection of the first lower longeron and the first frame member when the tail boom saddle is in a blade maintaining position and such that the second tail-engaging pad engages the outer surface of the tail boom outer skin generally at the intersection of the first lower longeron and the second frame member when the tail boom saddle is in the blade maintaining position, the blade maintaining position being a position in which the upper and lower saddle portions exert clamping forces against the tail boom outer skin and the main rotor blades are operatively secured to the tail boom saddle in a manner such that the tail boom saddle maintains the main rotor blades in the stowed position.

26. A tail boom saddle as set forth in claim 25 wherein the rocker mechanism is adapted to space the lower saddle frame a distance from the tail boom outer skin when the tail boom saddle is in the blade maintaining position.

27. A tail boom saddle as set forth in claim 26 wherein the rocker mechanism further comprises a rocker member, the first and second tail-engaging pads being operatively connected to the rocker member.

28. A tail boom saddle as set forth in claim 27 further comprising a pad connector operatively connecting the first tail-engaging pad to the rocker member, the pad connector being adapted to adjust the distance between the lower saddle frame and the tail boom outer skin.

29. A tail boom saddle as set forth in claim 27 further comprising a pad connector operatively connecting the first tail-engaging pad to the rocker member, the pad connector comprising a torque limiting screw.

* * * * *